United States Patent [19]
Hamilton

[11] Patent Number: 5,348,332
[45] Date of Patent: Sep. 20, 1994

[54] PUP TRAILER DOLLY BACK-UP DIRECTION GUIDE

[76] Inventor: David Hamilton, 111 N. 5th, Weatherford, Okla. 73096

[21] Appl. No.: 74,649

[22] Filed: Jun. 11, 1993

[51] Int. Cl.⁵ .......................... B60D 1/167; B60D 1/58
[52] U.S. Cl. ................................. 280/476.1; 280/408; 280/416.2; 280/455.1; 280/DIG. 14
[58] Field of Search .................. 280/476.1, 408, 411.1, 280/416.1, 416.2, 446.1, 448, 455.1, 459, 480, 491.5, 495, 496, DIG. 14

[56] References Cited

U.S. PATENT DOCUMENTS

| | | | |
|---|---|---|---|
| 2,159,721 | 5/1939 | Wright | 280/DIG. 14 X |
| 2,592,219 | 4/1952 | West et al. | 280/476.1 |
| 2,712,945 | 7/1955 | Peterson | 280/DIG. 14 X |
| 3,033,593 | 5/1962 | Zaha | 280/DIG. 14 X |
| 3,497,241 | 2/1970 | Jones | 280/455.1 |
| 3,544,132 | 12/1970 | Collins | 280/455.1 |
| 3,659,874 | 5/1972 | Rendessy | 280/455.1 |
| 3,680,891 | 8/1972 | Rendessy | 280/455.1 |
| 3,697,099 | 10/1972 | Potts et al. | 280/455.1 |
| 5,098,115 | 3/1992 | Haire et al. | 280/476.1 |

Primary Examiner—Margaret A. Focarino
Assistant Examiner—Florian Zeender
Attorney, Agent, or Firm—Robert K. Rhea

[57] ABSTRACT

A back-up direction guide for a pup trailer dolly having a frame sprung from a wheel equipped axle and connected to the rearward end of a truck-trailer by an A-frame tongue portion is formed by a rigid plate clamped in overlying relation to the forward end portion of the pup trailer dolly frame. Load binders are pivotally connected with the respective ends of the plate and tensioned flexible members connected with the respective load binder and the respective outer lower limit of the rearward end portion of the truck-trailer guide the pup trailer dolly in a selected direction during rearward backing movement of the truck-trailer.

3 Claims, 2 Drawing Sheets

PUP TRAILER DOLLY BACK-UP DIRECTION GUIDE

BACKGROUND OF THE INVENTION

This invention relates to commercial trailers towed in tandem behind a truck-trailer and more particularly to a pup trailer dolly back-up direction guide for positioning the pup trailer dolly under the forward end portion of a semitrailer to be towed.

1. Field of the Invention

A commercial truck-trailer, where permitted frequently tows a second semitrailer which is frequently referred to as a "pup trailer".

A fifth wheel dolly, commonly referred to as a "pup trailer dolly", towed by a truck-trailer is disposed under the forward end portion of the trailing semitrailer for supporting the latter in mobile fashion.

During normal trucking operations it is frequently necessary for the driver of the truck-trailer to park the trailing semitrailer or pup trailer and remove the pup trailer dolly from under its forward end portion and recouple the pup trailer dolly to another semitrailer for towing behind the truck-trailer.

This is normally a difficult and time consuming operation for a lone truck driver since the mass of the pup trailer dolly is approximately one ton. The driver must decouple the safety chains, electrical system and air brake lines connected with the pup trailer dolly and manually back or manipulate the pup trailer dolly into a selected position at the front or forward end portion of the semitrailer to be coupled.

The forward end of the pup trailer dolly is centrally connected to the rearward end of the towing semitrailer in trailer hitch fashion by a pintle hook.

Since the overall dimensions of the pup trailer dolly are relatively small when compared with the overall dimensions of the semitrailer of a truck-trailer unit, it is a difficult, if not impossible, operation for the driver to observe its position and direction and back a truck-trailer and pup trailer dolly into fifth wheel coupling position of the dolly at the forward end of a second semitrailer.

After manually positioning the pup trailer dolly at the forward end of a second semitrailer to be towed, the driver backs the truck-trailer into position for connection with the pup trailer dolly. The dolly is pintle hook connected with the forward semitrailer and moved rearwardly by the truck-trailer under the forward end portion of the second semitrailer where the fifth wheel on the dolly receives, in locking relation, the fifth wheel pin depending from the second semitrailer. The safety chains, electrical system and air brake lines are again connected for over-the-road travel.

Even with ideal weather conditions and hard surface truck terminal yards valuable time and fuel is consumed in changing a pup trailer dolly from towing one semitrailer to proper coupled position for towing a different semitrailer.

The above problems in transferring a pup trailer dolly from one semitrailer to another are minimized by this invention which temporarily eliminates the pivotal action between a towing truck-trailer and positions a pup trailer dolly for backing the dolly with a truck-trailer as a unit, into position at the forward end portion of a second semitrailer to be towed.

2. Description of the Prior Art

I do not know of any patents disclosing a pup trailer dolly backing direction guide such as is disclosed by this invention.

SUMMARY OF THE INVENTION

An elongated rigid plate transversely spans in overlying relation and is rigidly secured by clamps to the forward end portion of a pup trailer dolly.

Load binders pivotally connected with the respective end portion of the rigid plate adjustably support one end portion of flexible strands removably connected at their other ends with respective rearward lower side limits of a towing semitrailer.

With the dolly frame tongue abutting the rearward end of the towing semitrailer, the respective load binder maintains the respective flexible member taut thus securing the pup trailer dolly against lateral pivoting movement relative to the longitudinal axis of the towing semitrailer, similar to an additional axle. The flexible members maintain the pup trailer dolly centrally positioned behind the towing semitrailer as the latter backs the pup trailer dolly toward a second semitrailer.

The principal object of this invention is to provide a backup direction guide rigidly connecting a pup trailer dolly to a truck-trailer permitting the truck-trailer and pup trailer dolly to move backward, as a unit, into position for coupling the pup trailer dolly with a second semitrailer which minimizes the time required for decoupling and recoupling the pup trailer dolly from one semitrailer to another.

DESCRIPTION OF THE PREFERRED EMBODIMENTS

Figure 1:
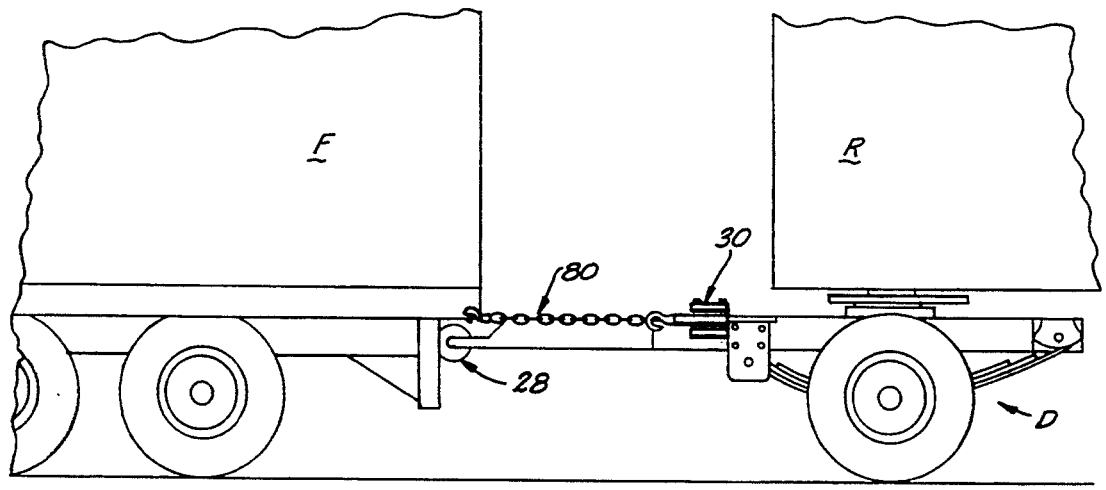
FIG. 1 is a fragmentary side elevational view of a truck-trailer, towing a second semitrailer, having the device installed on a pup trailer dolly disposed under the rearward trailer.

Like characters of reference designate like parts in those figures of the drawings in which they occur.

In the drawings:

Referring first to FIG. 1, the reference numeral F indicates the fragmentary rearward portion of a semitrailer of a truck-trailer unit towing a rearward semitrailer or pup trailer R, having its forward end portion supported by a fifth wheel dolly D herein referred to as a pup trailer dolly.

Figure 2:
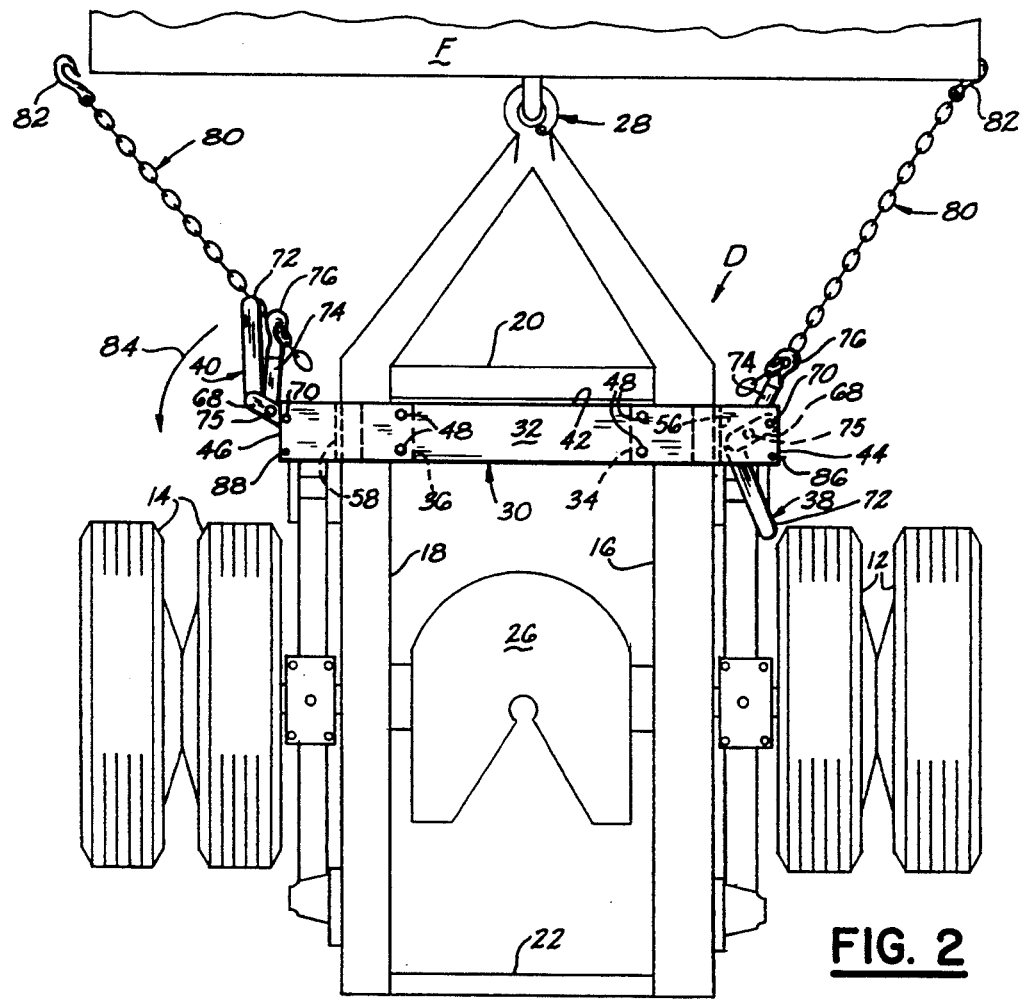
FIG. 2 is a fragmentary top view, to a larger scale, of the pup trailer dolly with the direction guide installed in operative position; and, FIG. 3 is an exploded perspective view, to a further enlarged scale, of the back-up direction guide components.

Referring also to FIG. 2, the pup trailer dolly D comprises a horizontal frame 10 sprung from an axle journalling dual wheels 12 and 14. The frame 10 comprises parallel right and left beam members 16 and 18 interconnected at their forward and rearward end portions by cross braces 20 and 22. The frame beams 16 and 18 converge at their forward ends and are connected by a pintle hook 28 to the rearward end of the towing semitrailer F. The frame 10 supports a fifth wheel 26 which lockingly receives the fifth wheel pin, not shown, depending from the forward end portion of the rearward semitrailer R for supporting the latter when towed over-the-road by the forward trailer F.

Figure 3:
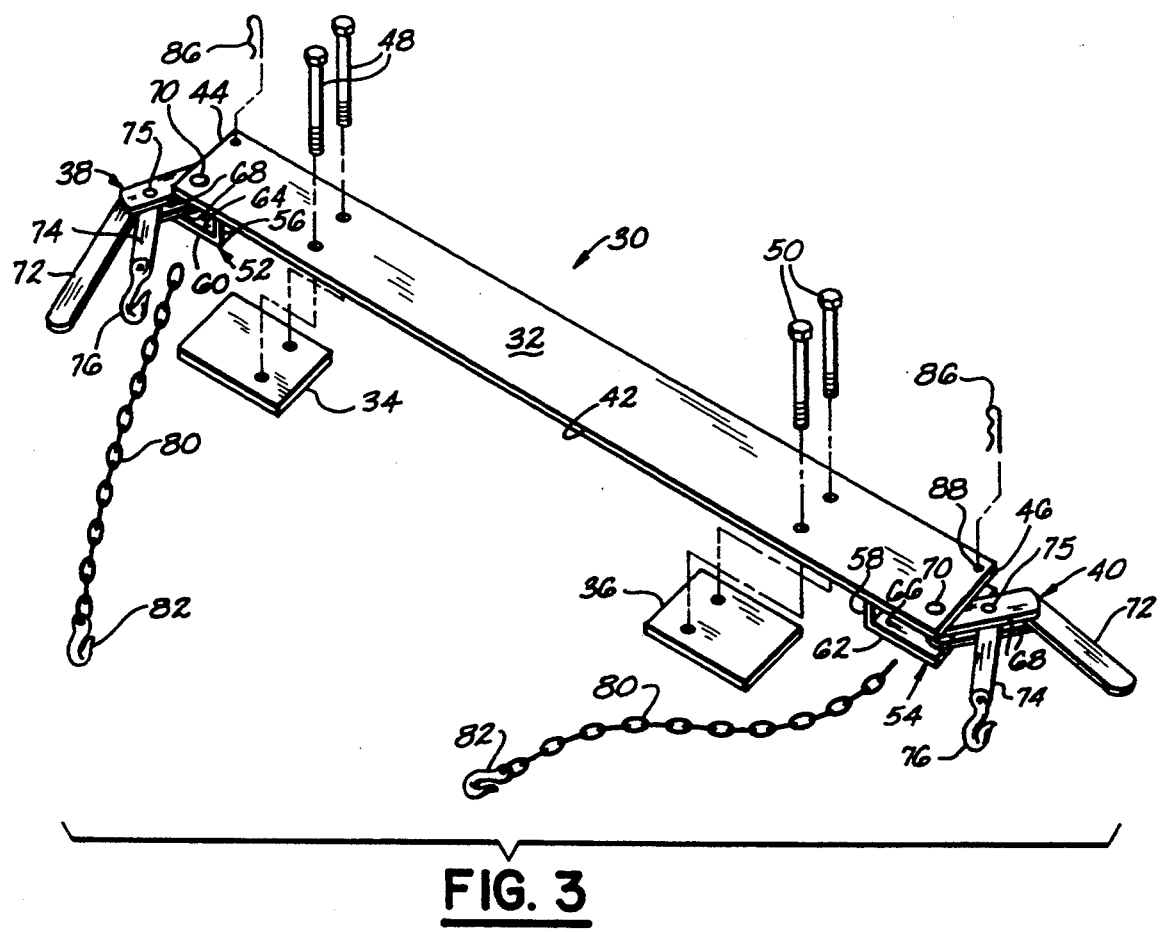

Referring also to FIG. 3, the numeral 30 generally indicates the back-up direction guide for the pup trailer dolly D. The backup guide 30 principally comprises an elongated plate 32 having clamp jaws or beam clamps 34 and 36 intermediate its respective end portions and a pair of load binders 38 and 40 connected with respective end portions of the plate.

The plate 32 is selected from stock having a desired thickness for rigidity and is relatively narrow when compared with its length. The plate is transversely disposed across the forward end portion of the frame with its forward longitudinal edge surface 42 parallel with the frame cross member or brace 20. The length of the plate 32 is such that its respective ends 44 and 46 project a predetermined distance beyond the outer limit of the frame side beams 16 and 18.

The frame clamp jaws 34 and 36 respectively comprise rectangular sections of similar rigid sheet material and are each line drilled with the plate 32 and underlie, at one end portion, a depending surface of the frame side beams 16 and 18 and receive pairs of bolts 48 and 50 for rigidly connecting the plate 32 to the forward end portion of the frame 10.

L-shaped members 52 and 54 are respectively connected to the depending surface of the plate 32 outwardly of the respective side beam 16 and 18. The L-shaped members have short legs 56 and 58, respectively, and are connected, as by welding, to the depending surface of the plate 32. The plane of each short leg is normal to the depending surface of the plate. The longer leg 60 and 62 of the respective L-shaped member projects horizontally outward, parallel with the respective end portions of the plate 32, and form side walls defining open slots 64 and 66 respectively receiving the load binders 38 and 40.

Since the load binders 38 and 40 are identical, only the load binder 38 is described in detail, in the interest of brevity.

The load binder 38 comprises a pair of parallel strap iron links 68 disposed at one end portion within the L-shaped recess 64 and respectively fastened for horizontal pivoting movement as a unit with the respective other end portion by a pair of pins or rivets 70, only one being shown, extending vertically through one link and the plate 32 and the other link and the leg 60.

The other end portion of the links are rigidly connected with one end portion of a handle 72 for pivoting the load binder 38 about the vertical axis of the pins 70. A third link or pull strap 74 is pivotally connected at one end portion between the pair of links 68 intermediate their ends, as at 75, and is pivotally connected at its other end portion with a chain grab hook 76 and normally projects forwardly of the plate 32 when the handle is pivoted in the direction of the towing semitrailer F.

A pair of flexible elements, such as chains 80, of a predetermined length, each having a grab hook 82 at one end, are engageable by the chain link hooks 76 for securing the plate 32 to the rearward end of the forward semitrailer F, as presently explained.

OPERATION

Assuming the back-up direction guide apparatus 30 has been installed on a pup trailer dolly D and that the dolly D is to be decoupled from the towed rearward semitrailer R and recoupled with another semitrailer to be towed by the forward semitrailer F. The flexible elements or chains 80 are secured by their respective grab hook 82 to a rearward depending corner portion of the towing semitrailer F, preferably in the plane of the plate 32. The opposite or rearward end portion of the respective flexible element is engaged by the load binder grab hooks 76 when the load binder handle 72 is disposed forwardly in the position of the load binder 40 (FIG. 2).

The actual position of the grab hook on the chain 80 being determined by trial and error and previous experience in placing tension on the respective chain 80.

With the grab hook engaging the flexible element, the handle 72 of the respective load binder is then pivoted rearwardly as in the direction of the arrow 84 to the off-center toggle link locked position of the load binder handle in substantially the position illustrated by the handle 72 of the load binder 38 (FIG. 2). This disposes the pivot pin axis 75 of the pull strap 74 off center inwardly in toggle link locked fashion.

A wire clip 86, commonly referred to as a "hair pin", has its straight portion inserted vertically through an aperture 88 formed in the plate end portions opposite the position of the rivets 70 which prevents outward movement of the handle and links 68 in a load binder releasing action.

With the flexible elements 80 under a desired tension, the pup trailer dolly is decoupled from the towed semitrailer R and the truck-trailer unit F moves to a desired location and backs the pup trailer dolly D toward a semitrailer to be towed.

The chains, thus, substantially form a rigid connection between the frame of the pup trailer dolly and the semitrailer F and forms a rearwardly projecting extension of the semitrailer F when the pup trailer dolly is backed toward a desired position for receiving the fifth wheel pin of a trailer to be towed.

The conventional V-shape of the fifth wheel 26 facilitating any slight misalignment of the pup trailer dolly fifth wheel 26 with respect to the fifth wheel pin depending from the trailer to be towed.

After coupling the pup trailer dolly with a trailer to be towed the hair pins 86 are removed and the load binder handles pivoted in the forward direction to release the flexible elements 80 which are then stored for subsequent use.

Obviously the invention is susceptible to changes or alterations without defeating its practicability. Therefore, I do not wish to be confined to the preferred embodiment shown in the drawings and described herein.

I claim:

1. A backup direction guide for a pup trailer dolly having a horizontal frame having side beams sprung from a wheel equipped axle having a semitrailer supporting fifth wheel and having a forward end portion characterized by an A-frame pintle hook equipped tongue connected with a towing vehicle, the improvement comprising: means for temporarily connecting said pup trailer dolly against any lateral movement relative to said towing vehicle, said means including:

an elongated rigid plate transversely overlying and projecting laterally outward from a forward end of said frame side beams;

clamp jaws cooperating with said plate for gripping intermediate portions of said frame side beams;

an L-shaped member underlying and cooperatively secured to each end portion of said plate for forming an outwardly open slot having a side wall and a bottom wall;

a load binder secured to each bottom wall of the respective slot; and, an elongated flexible member tautly extending between each load binder and a respective rearward lowermost lateral limit of a pup trailer dolly towing vehicle.

2. A backup direction guide for a pup trailer dolly having a horizontal frame having side beams sprung from a wheel equipped axle having a semitrailer supporting fifth wheel and having a forward end portion characterized by an A-frame pintle hook equipped tongue connected with a towing vehicle, the improvement comprising: means for temporarily connecting said pup trailer dolly against any lateral movement relative to said towing vehicle, said means including:

clamp means including a rigid member secured to and projecting laterally outward from opposing sides of said frame forward end portion;

load binders secured to said clamp means on opposing sides of said frame;

elongated flexible members tautly extending between each load binder and a respective rearward lower most lateral limit of a pup trailer dolly towing vehicle the clamp means including an elongated plate transversely overlying said frame, and clamp jaws cooperatively secured to said plate for gripping intermediate portions of said frame side beams; and said plate characterized by a laterally open slot having parallel opposing side walls at its respective end portions for respectively pivotally supporting said load binders.

3. A backup direction guide for a pup trailer dolly having a horizontal frame having side beams sprung from a wheel equipped axle having a semitrailer supporting fifth wheel and having a forward end portion characterized by an A-frame pintle hook equipped tongue connected with a towing vehicle, the improvement comprising: means for temporarily connecting said pup trailer dolly against any lateral movement relative to said towing vehicle, said means including:

a pair of toggle link means each of said pair including pivotally interconnected links secured to and projecting laterally outward and forward from opposing forward sides of said frame;

a respective handle for pivoting said links; and, elongated flexible members tautly extending between each toggle link means and a respective rearward lowermost lateral limit of a pup trailer dolly towing vehicle.

* * * * *